(12) United States Patent
Svedin (10) Patent No.: US 7,720,262 B2
(45) Date of Patent: May 18, 2010

(54) METHOD AND DEVICE FOR RECORDING FINGERPRINT DATA

(75) Inventor: Ola Svedin, Malmö (SE)

(73) Assignee: Precise Biometrics AB, Lund (SE)

( * ) Notice: Subject to any disclaimer, the term of this patent is extended or adjusted under 35 U.S.C. 154(b) by 1252 days.

(21) Appl. No.: 10/504,958

(22) PCT Filed: Feb. 18, 2003

(86) PCT No.: PCT/SE03/00262

§ 371 (c)(1),
(2), (4) Date: Sep. 20, 2004

(87) PCT Pub. No.: WO03/069542

PCT Pub. Date: Aug. 21, 2003

(65) Prior Publication Data

US 2005/0152584 A1 Jul. 14, 2005

Related U.S. Application Data

(60) Provisional application No. 60/367,485, filed on Mar. 27, 2002.

(30) Foreign Application Priority Data

Feb. 18, 2002 (SE) .................................. 0200460

(51) Int. Cl.
*G06K 9/00* (2006.01)

(52) U.S. Cl. .................. 382/115; 382/124; 382/125

(58) Field of Classification Search ................. 382/115, 382/124, 125; 340/5.53
See application file for complete search history.

(56) References Cited

U.S. PATENT DOCUMENTS 4,581,760 A 4/1986 Schiller et al.

(Continued)

FOREIGN PATENT DOCUMENTS

EP 0 786 735 7/1997

(Continued)

*Primary Examiner*—Brian Q Le
(74) *Attorney, Agent, or Firm*—Buchanan Ingersoll & Rooney PC (57) ABSTRACT

In a method for recording reference fingerprint data for a person, at least two fingerprint images are recorded that depict at least partially different areas of one and the same finger of the person. Data from these images is stored in at least two alternative sets of reference fingerprint data that are to be used in checking the identity of the person. This method makes it possible to use a small sensor that only records partial fingerprints, both when recording reference data and when verifying, without the person having to make repeated attempts during the verification in order for the sensor to record the same area on the finger both when recording reference data and during the verification. In addition, a method is described for checking identity, in which method the fact is utilized that there are alternative sets of reference fingerprint data, and devices for carrying out the methods.

21 Claims, 4 Drawing Sheets

U.S. PATENT DOCUMENTS

| | | |
|---|---|---|
| 4,995,086 A | 2/1991 | Lilley et al. |
| 5,067,162 A * | 11/1991 | Driscoll et al. ............. 382/126 |
| 5,982,913 A | 11/1999 | Brumbley et al. |
| 6,049,621 A | 4/2000 | Jain et al. |
| 6,289,114 B1 * | 9/2001 | Mainguet .................... 382/124 |
| 7,333,637 B2 * | 2/2008 | Walfridsson ................ 382/124 |
| 2001/0005221 A1 | 6/2001 | Huang |

FOREIGN PATENT DOCUMENTS

| | | |
|---|---|---|
| EP | 0 813 164 | 12/1997 |
| EP | 0 918 300 | 5/1999 |
| SE | 8101707-1 | 9/1982 |
| SE | 0102376-1 | 12/2002 |
| WO | WO 99/43258 | 9/1999 |
| WO | WO 00/49944 | 8/2000 |
| WO | WO 01/80167 | 10/2001 |
| WO | WO 01/84494 | 11/2001 |

* cited by examiner

METHOD AND DEVICE FOR RECORDING FINGERPRINT DATA

The benefit is claimed under 35 U.S.C. 119(a)-(d) of Swedish Application No. 0200460-4, filed Feb. 18, 2002, and under 35 U.S.C. 119(e) of U.S. Provisional Application No. 60/367,485, filed Mar. 27, 2002.

FIELD OF THE INVENTION

The present invention relates to a method and a device for recording reference fingerprint data for a person. It further relates to a method and a device for checking identity.

BACKGROUND OF THE INVENTION

It has been known for many years that fingerprints can be used to check a person's identity. For the checking, a current fingerprint is recorded from the person whose identity is to be checked and this is compared with previously recorded reference fingerprint data. The checking can concern a verification of the identity of the person. In such a case, the current fingerprint is compared only with reference data for the person that the person whose identity is to be verified is purporting to be. The checking can also concern an identification of the person's identity. In such a case, the current fingerprint is compared with reference data for several different persons in order to determine whether the current fingerprint comes from any of these persons.

There are different types of sensors for recording fingerprints. The sensors can for example be optical, thermal, pressure-sensitive or capacitive. Traditionally, the sensors have had a surface with a size that makes possible the recording of a complete fingerprint. Particularly with regard to capacitive sensors, that are manufactured from silicon, the cost of a sensor is, however, greatly dependent upon the size of the surface of the sensor. There is therefore a desire to be able to make the sensors smaller.

EP 0 813 164 describes a thermal sensor that only allows a part of a fingerprint to be recorded. In order to record a complete fingerprint, the user passes his finger across the sensor which records images at a high frequency. The images, that partially overlap each other, are then combined into an image of a complete fingerprint. The identity check is carried out in the usual way on the basis of the complete fingerprint.

This sensor has the advantage that it has a smaller sensor surface than sensors that record a complete fingerprint with a single image. The disadvantage, however, is that it is more difficult to use, as the user must pass his finger over the sensor at a relatively even speed in order for the image to be clear. If the user passes his finger over the sensor slowly or even stops, the result will be impaired as the sensor is based on temperature differences that are evened out immediately if the finger is held still.

WO 00/49944, that was filed by the Applicant of the present application, describes the use of a small sensor that records a partial fingerprint, that is only a part of a complete fingerprint. According to this application, a reference fingerprint image is recorded using a traditional "large" sensor or using a small sensor with the images combined into an image of a complete fingerprint. For the identity check, on the other hand, only an image of a partial fingerprint is recorded. This partial image is compared with the considerably larger reference image in all possible relative positions in order to check whether the partial image corresponds to any partial area of the reference image and can thereby be assumed to come from the same person as the reference image.

This method makes it possible for the user to hold his finger still on the sensor during the identity check. The comparison of all overlapping positions requires, however, a certain processor capacity and can take a relatively long time. In addition, an essentially complete reference fingerprint must be stored. This can be a disadvantage, for example when the check is to be carried out on a smart card which normally has limited processor and memory capacity.

In other known methods for checking identity using fingerprints, a complete fingerprint is, however, not normally stored as reference fingerprint data, but instead the most relevant information is extracted from the fingerprint and saved as reference fingerprint data. For example, different partial areas of an image of a fingerprint can be saved as reference data.

WO 01/84494, that was also filed by the Applicant of the present application, describes in addition how the identity check can be divided between a smart card and a processing unit in order to minimize the operations that need to be carried out on the smart card and that therefore require processor capacity. More specifically, the reference data is divided in this instance into a public part, that can leave the smart card, and a private part, that cannot leave the smart card. The public part contains a partial area and coordinates that indicate the location of additional partial areas that are to be found in the private part. To carry out an identity check, a current fingerprint is recorded for the person whose identity is to be checked. The public partial area is transmitted from the smart card to the processing unit in which it is compared with the current fingerprint in order to check whether it matches anywhere in this. If such is the case, the relative positions (translation and rotation) of the reference data and the current fingerprint are determined. The coordinates in the public part of the reference data are hereafter used to determine the partial area of the current fingerprint that is to be matched against the partial areas in the private part of the reference data. These partial areas of the current fingerprint are sent to the smart card where the identity check is concluded. As an alternative to the public partial area, a set of special characteristics, so-called features, can be stored in the public part of the reference data and used in order to determine the relative positions of the reference data and the current finger-print.

If a small sensor, that is a sensor that only records a partial fingerprint, is used for this application, the problem arises that it can happen that the user places his finger on the sensor in such a position that only some of the partial areas or none of these at all lie within the sensor surface area. If this occurs, the identity check will not succeed due to the fact that there is an insufficient number of partial areas to compare. The user must then carry out a new attempt with his finger in a new position. A number of attempts can be required and this is of course inconvenient for the user.

SE 0102376-1, which was filed on 29 Jun. 2001 by the same Applicant as in the present application and which was thus not publicly available at the time of filing the present application, proposes a solution to this problem which consists of checking how well the reference data is aligned with the current fingerprint. More specifically, on the basis of where the public partial area is located in the current fingerprint and using the coordinates for the private partial areas, it is possible to work out whether the private partial areas are located within the sensor surface area and thus whether the identity check has the possibility of success. If such is not the case, an indication can be given to the user regarding how he or she is to move his/her finger in relation to the sensor in order to improve the alignment.

SUMMARY OF THE INVENTION

An object of the present invention is to solve the problem of the user possibly needing several attempts to identify himself with his finger in different positions on the sensor where this is of the type that only records a partial fingerprint.

The object is achieved wholly or partially by means of a method and a device for recording reference fingerprint data according to claims 1, 11 and 14 respectively, and a method and a device for checking identity according to claims 16 and 24 respectively.

The invention thus relates to a method for recording reference fingerprint data for a person, comprising the steps of receiving at least two fingerprint images that depict at least partially different areas of one and the same finger of the person, and storing data from said at least two fingerprint images as at least two alternative sets of reference fingerprint data, that comprise data from at least partially different areas of the finger, for use in checking the identity of the person, wherein at least two alternative sets of reference fingerprint data are stored in a first unit in which checking of the person's identity is to be carried out, each of the sets of reference fingerprint data comprising public data that can be communicated from the first unit to a second unit during the check, and also private data that is used exclusively in the first unit during the check.

As more than one set of reference fingerprint data is stored, a larger part of the person's fingerprint is imaged in total, and the chances are thereby increased of a partial fingerprint that is taken during an identity check lying within the imaged part of the fingerprint, which in turn leads to fewer attempts, and optimally only one attempt, needing to be made in order, for example, to verify a person's identity.

Instead of the user needing to move his finger around and try several different positions on the sensor on each occasion when he wants to verify his identity, this need now only be carried out on one occasion and that is when recording the reference data. This should be a considerable improvement for the user.

In addition, as alternative sets of reference fingerprint data are stored, the same algorithms can be used both for a small sensor that records a partial fingerprint and for a large sensor that records a complete fingerprint and only needs one set of reference fingerprint data as the problem of the position of the finger on the sensor is reduced.

The alternative sets of reference fingerprint data can be stored in various ways. They can, for example, be stored as completely separate sets that do not share any data at all. If overlapping data is included in the alternative sets, this data is thus stored once for each set. The different sets can alternatively constitute different subsets of a commonly stored quantity of data. If overlapping data is included in the alternative sets, in this case it thus only needs to be stored once.

The different sets of reference fingerprint data can be used for checking identity. According to the invention, a method for checking identity comprises more specifically the steps of receiving a current fingerprint image that depicts a part of a finger of a person whose identity is to be checked; comparing data from the fingerprint image with data from at least a first set of reference fingerprint data of at least two previously stored sets of reference fingerprint data that relates to at least partially different areas of one and the same finger of a person whose identity is known; and, on the basis of the result of the comparison, determining which of said at least two alternative sets of reference fingerprint data is to be used for checking the identity. In checking the identity it is thus determined whether the person whose identity is to be checked has the same fingerprint as the person whose identity is known, that is whether they are one and the same person.

Each of the sets of reference fingerprint data can comprise a plurality of partial areas of the corresponding fingerprint image. This makes possible storage and matching of the reference fingerprint data on, for example, a smart card and other units with limited processor and memory capacity.

In addition, one of the partial areas can be used to determine which set of reference fingerprint data is to be used for an identity check. Thus no exhaustive checking against all data in all the sets of reference data needs to be carried out and the time required for the identity check is thus increased very little, in spite of the fact that there are several different sets of reference fingerprint data. This can be a particular advantage when the identity check is carried out in situations where there is already a risk of it being slow, such as identity checks on smart cards, via networks or in databases where the check must be carried out against reference data from several persons.

As an alternative to using a partial area in order to determine which set of reference fingerprint data is to be used for an identity check, features can be used. As mentioned above, a feature is a special characteristic in the fingerprint, for example a point where a ridge ends or a point where a ridge divides. Such characteristics are also known as "minutia points". In this case, the positions and/or other information are extracted, such as the angle of/or type of feature from the fingerprint. This information is then stored in the public part of the reference fingerprint data instead of the public partial area.

The methods according to the invention can be implemented in devices that comprise a signal processor. The signal processor can be a processor that is provided with suitable software for carrying out the method. It can also comprise application-specific hardware, such as an ASIC, a programmable logical circuit, such as an FPGA, or digital or analog circuits or some suitable combination thereof.

BRIEF DESCRIPTION OF THE DRAWINGS

The present invention will now be described in more detail by means of an embodiment and with reference to the accompanying drawings, in which.

DETAILED DESCRIPTION OF AN EMBODIMENT

Figure 1A:
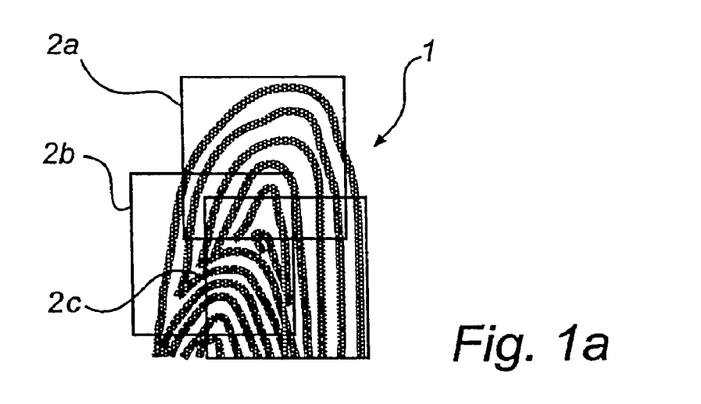
FIG. 1a shows schematically a fingerprint in which are marked different areas that are imaged during the recording of alternative sets of reference fingerprint data.

The present invention is based on the idea of recording from one and the same finger at least two different sets of reference fingerprint data, which correspond at least partially to different areas of the finger. This idea is illustrated in FIG. 1a, which shows schematically a complete fingerprint 1, which is recorded from a person's fingertip and in which are marked three areas 2a-2c that are imaged using a "small" sensor when recording reference fingerprint data. The three areas correspond to three partial fingerprints. As shown in FIG. 1a, the areas 2a-2c can overlap each other. However, they do not need to overlap.

Figure 1B:
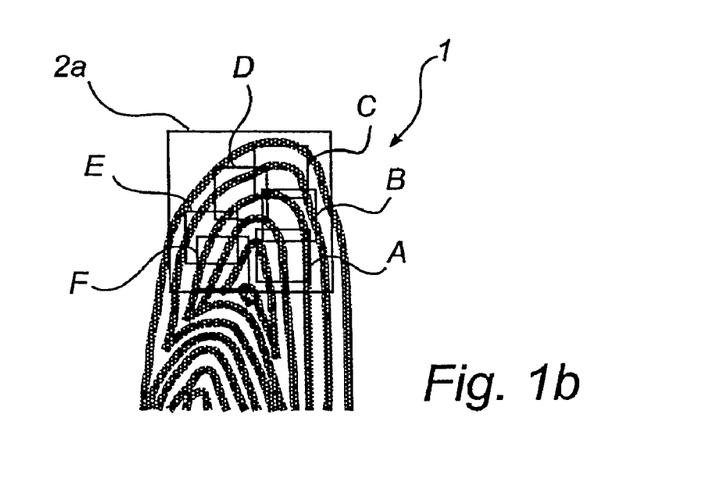
FIG. 1b shows schematically the same fingerprint as in FIG. 1a but with only one imaged area marked.

As has been described by way of introduction, the whole of the areas 2a-2c do not normally need to be stored as reference fingerprint data, but only extracted data. FIG. 1b shows the same fingerprint as in FIG. 1a, but only the upper area 2a is marked. In this area six partial areas A-F are indicated. These partial areas can be stored as reference fingerprint data.

When the identity check is to be carried out, it is usually sufficient for the user to place his finger once on the small sensor. FIG. 1c shows again the same fingerprint 1 as in FIG. 1a. A current area 3 that is imaged by the small sensor is marked in the fingerprint. This current area corresponds best to the upper area 2a in FIG. 1a, which for example can be determined by a partial area of each of the areas 2a-2c in FIG. 1a being compared with the current area. This means in turn that it is a set of reference fingerprint data that essentially corresponds to the uppermost reference area that is to be used for the actual identity check.

Figure 1C:
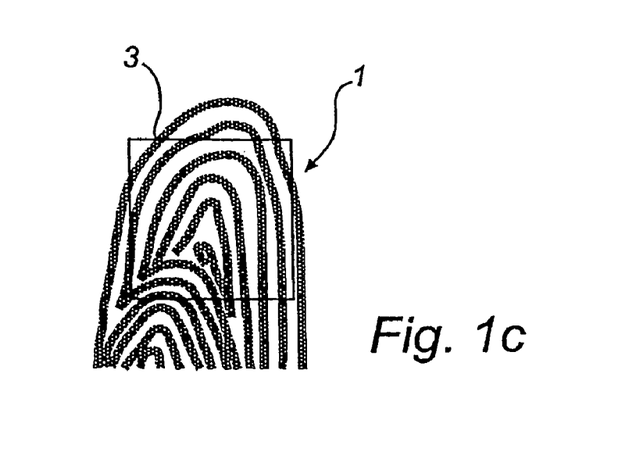
FIG. 1c shows schematically the same fingerprint as in FIG. 1a, but in which is marked an area that is imaged during the identity check.

If only the middle or the lower area had been imaged during the recording of reference fingerprint data, the identity check would not have the possibility of success as the current area would not then have overlapped the area that was imaged during the recording of the reference fingerprint data and it would therefore not be possible to determine that it came from the same person. The user would have had to try at least once more with his finger in a different position on the sensor.

Figure 2:
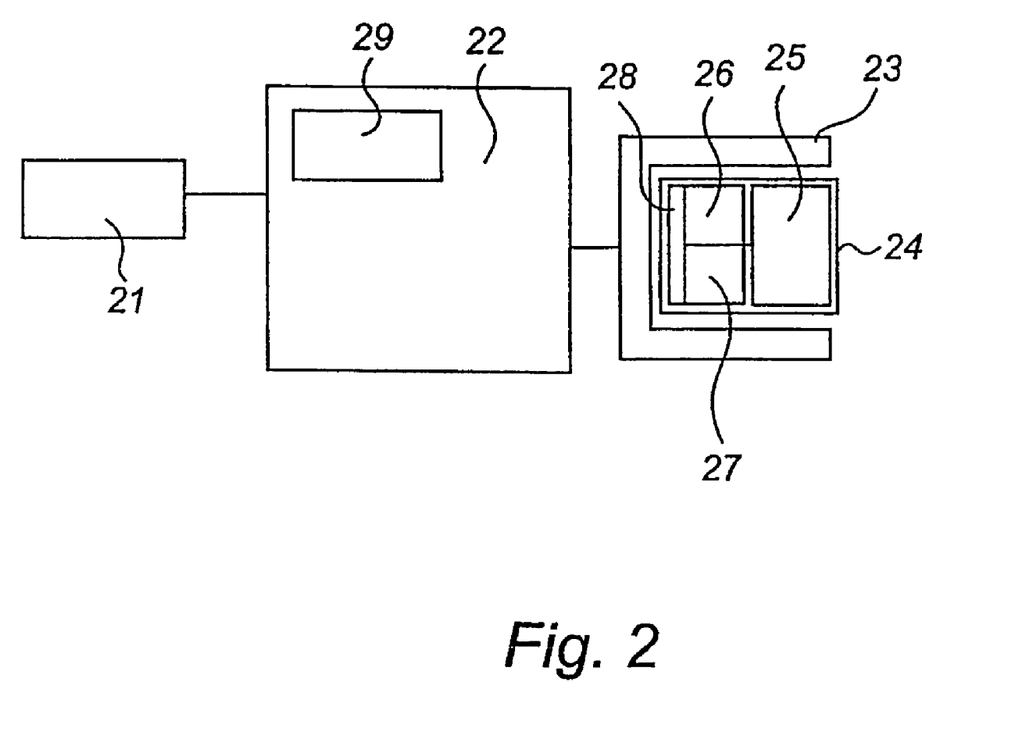
FIG. 2 shows schematically a system in which the methods and the devices according to the invention can be used.

FIG. 2 shows a system that can, but need not, be used for both recording of reference fingerprint data and checking identity. The system comprises a fingerprint sensor 21, a computer unit 22 that constitutes an example of a signal processor, a smart card reader 23 and a smart card 24.

The sensor 21 can be optical, capacitive, thermal, pressure sensitive or of any other suitable type. Its sensor surface is such a size that it can only record a partial fingerprint from a normal person's fingertip. A sensor for recording a complete fingerprint is a size of at least 200*200 pixels with a resolution of 500 dpi. Such a sensor records an image of the whole area of the fingertip that comes into contact with a surface when the fingertip is pressed against a surface that is the same size or larger than the fingertip. A small sensor for a partial fingerprint can be a size of, for example, 128*128 pixels or less. This sensor will only image a part of the area on the fingertip that comes into contact with a surface when the fingertip is pressed against this. The sensor 21 can be separate or integrated with the computer unit 22 or the smart card reader 23 or the smart card 24.

The computer unit 22 can be an ordinary general-purpose computer, for example a PC. Alternatively, it can be a computer unit 22 that is dedicated to processing fingerprints. It can, for example, comprise a processor with program memory and working memory or can comprise specially adapted hardware, such as an ASIC (Application Specific Integrated Circuit) or a programmable logical circuit, such as an FPGA (Field Programmable Gate Array) or digital or analog circuits or some suitable combination thereof.

The smart card reader 23 can be any commercially available smart card reader. Alternatively, it can be a specially adapted smart card reader. It can be a separate unit or can be integrated with the computer unit 22.

The smart card 24 can be any type of smart card on which reference fingerprint data can be stored. The smart card has a signal-processing unit that comprises a processor 25, a memory 26 for storing reference fingerprint data which is extracted from a reference fingerprint from the holder of the smart card, and a working memory 27, in addition to communication circuits 28 that make possible communication between the smart card reader 23 and the smart card 24. The communication circuits 28 may, but need not, require contact between the smart card and the reader.

The system can further comprise indicating means 29 which are intended to provide information to the user. The indicating means 29 can, for example, consist of a display on which messages or signals are displayed, light-emitting diodes or some form of sound-generating circuit. In FIG. 2 the indicating means are shown on the computer unit 22, but they can also be arranged on the sensor 21.

Figure 3:
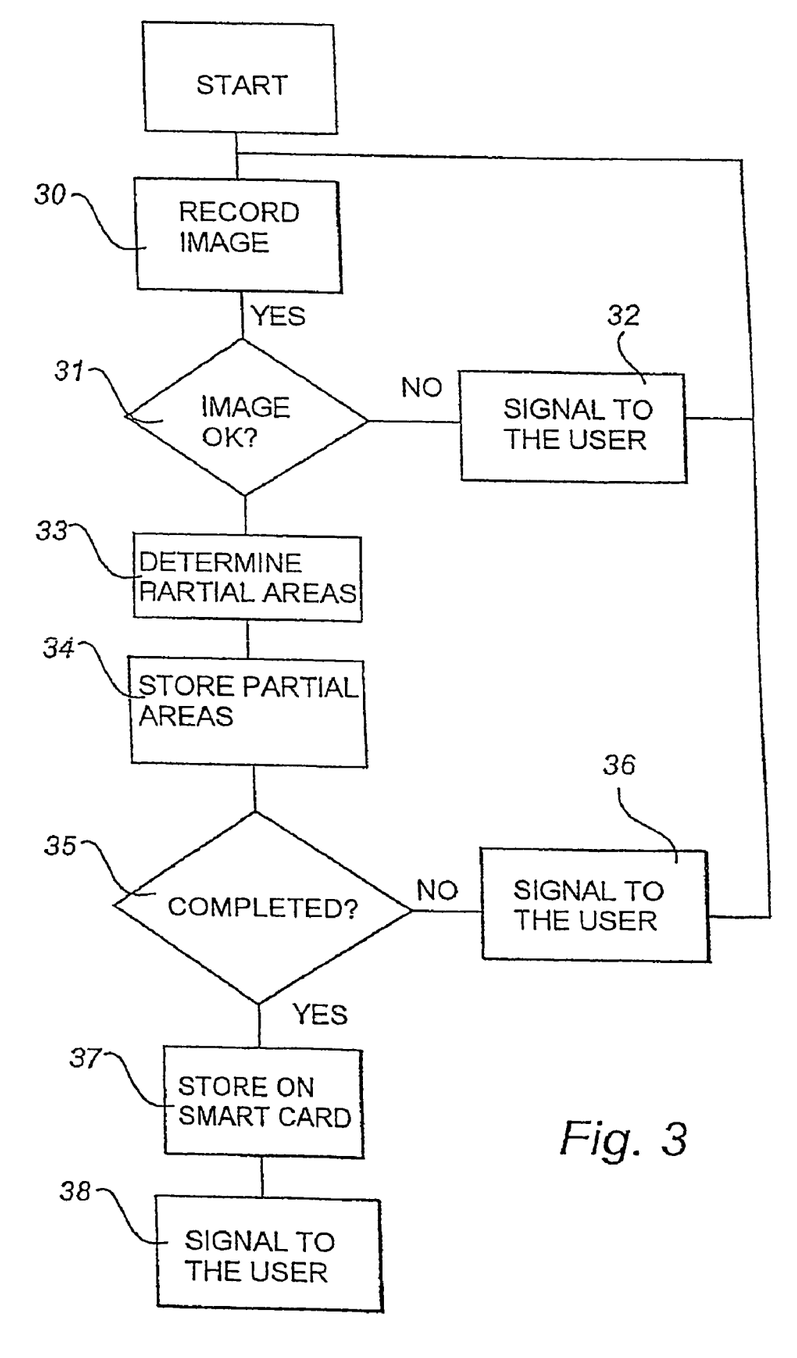
FIG. 3 is a flow chart and shows an example of a method for recording reference fingerprint data.

In the following, it will be described how recording of reference fingerprint data can be carried out using the system in FIG. 2 with reference to the flow chart in FIG. 3. In this example, the data that is extracted from the images consists of partial areas, and of the reference fingerprint data is stored on a smart card.

The reference fingerprint data is described in the following as a template. A template can comprise a complete or a partial fingerprint in the "raw" or unprocessed form in which it is recorded. Normally, however, a template contains selected, processed and compressed data from the recorded fingerprint. That is the case in this example.

The method starts with the user, that is the person for whom reference fingerprint data is to be recorded, placing his fingertip on the sensor 21. An image in grayscale of an area, for example the area 2a in FIG. 1, of the fingerprint is recorded, step 30. The image constitutes a digital representation of the fingerprint area.

In the next step 31 it is checked whether the image can be accepted. This check can, for example, comprise one or more of the elements below.

The computer unit 22 can, for example, check the recorded image so that it is ensured that there is actually a fingerprint in the image, that the fingerprint takes up a sufficiently large part of the image and that the fingerprint is sufficiently clear.

The computer unit 22 can, in addition, check whether the user has applied his finger with sufficient pressure on the sensor and that any moisture on the user's finger has not made it impossible for the sensor 21 to distinguish between ridges and grooves in the fingerprint.

In addition, the computer unit 22 can binarize the recorded image and compare it with one or more possibly previously recorded images in order to check whether the most recently recorded image differs sufficiently from the previously recorded images. If, for example, three sets of reference fingerprint data are to be recorded on the basis of three reference images, these should preferably differ so much that together they cover a considerably larger area than a single image so that the possibiities thereby increase that a later image taken in connection with an identity check, such as the image of the area 3 in FIG. 1c, lies within the area that is covered by the reference images so that the identity check has the possibility of success.

If the recorded image cannot be accepted, the computer unit 22 gives a signal to the user concerning this via the indicating means 29, step 32. In the simplest case, the signal can just be a signal to the effect that the image was not accepted. The signal can, however, also contain an indication of the reason why the image cannot be accepted and/or an indication of what the user should do in order to remedy the problem. For example, if the image that was not accepted overlaps previously recorded images by too great an extent, the user can receive an indication of in which direction his finger should be moved. The computer unit 22 can, for example, calculate this by comparing a partial area of a previously recorded and accepted image with the most recently recorded image and determining where in the most recently recorded image the partial area fits. In this way, the relative positions of the most recently recorded image and the previously recorded and accepted image are determined, and the computer unit can thereby determine how the finger should be moved in relation to the sensor 21 in order to reduce the overlap.

Subsequently the flow returns to step 30 for recording a new image.

If the recorded image can be accepted, in the next step 33 it is determined which partial areas are to be incorporated in the template.

First a partial area of the image, below called a public partial area, is selected from the image for storage in a public part of the template. The partial area can be selected in various ways. One way is to use the following three quality criteria: 1) Distinctness, that is how easy a partial area is to binarize, 2) uniqueness, that is how unique a partial area is, and 3) geographical location, that is where a partial area is located in the fingerprint.

The uniqueness can, for example, be checked by correlating the partial area with the surroundings and selecting a partial area with little correlation with the surroundings. Alternatively, partial areas with one or more features can be sought.

Regarding the geographical location, partial areas are preferred in the center of the image as this is where the fingerprint is least deformed when the user presses his finger against the sensor with various degrees of pressure and, in addition, there is a greater chance that the partial areas will be included in a later recorded image that is to be used for checking identity.

Depending upon the relationship between the size of the sensor, the number of partial areas and the size of the partial areas, the above-mentioned criteria can be more or less significant. It can happen that the partial areas overlap each other and even cover essentially the whole image. It can still be an advantage to select partial areas as the same algorithms for recording reference fingerprint data and for checking identity can then be used for images from sensors of different sizes.

As an alternative to selecting partial areas by means of various quality criteria, fixed partial areas can be selected.

In any case, a partial area is selected to form the public partial area. Preferably only one public partial area is selected so that as little information as possible about the user's fingerprint is available in the public part of the template. However, more public partial areas can be selected in order to achieve a more certain correlation between the public part of the template and a current fingerprint and thereby to achieve a more certain orientation of the template in relation to the current fingerprint.

When the public partial area has been selected, at least one but preferably a plurality of partial areas, below called private partial areas, is determined or extracted, for storage in a private part of the template on the smart card 24. The private partial areas are preferably selected according to the same quality criteria as the public partial area(s). Four to six private partial areas are preferably selected. More or fewer partial areas can be selected depending upon the required level of security, the required speed in matching on the smart card 24 and the available processor capacity of the smart card 24.

The size of the selected public and private partial areas is in this example (500 dpi), 48×48 pixels, but can easily be adapted by a person skilled in the art to suit the current requirements.

In association with the private partial areas being selected, their location in relation to a reference point is also determined. The reference point can, for example, be selected to be the midpoint in the public partial area or in one of these if there are several. The public partial area's reference point thus defines the origin in the local coordinate system in which the locations of the private partial areas are expressed. Other unambiguously determined reference points can of course also be selected, for example using features. The positions of the private partial areas are given as coordinates, for example for the midpoint in the private partial areas, in relation to the reference point. These coordinates are stored as part of the public part of the template.

In step 34, the computer unit 22 then stores the template, awaiting transmission to the smart card 24. The public part of the template will thus contain the public partial area(s) and coordinates for the locations of the private partial areas in relation to a reference point. Its private part will contain the private partial areas. Comparison criteria can also be stored in the private part in the form of threshold values for what degree of conformity is to be achieved in matching the private partial areas with partial areas of the current fingerprint in order for the template and the current fingerprint to be considered to come from the same individual. The partial areas are preferably stored in the form of bit maps.

Thereafter, in step 35, it is checked whether the recording of the reference fingerprint data has been completed. The criterion can, for example, be that a predetermined number of alternative templates have been stored and/or that templates that correspond to a fingerprint area of a predetermined size have been stored.

If the computer unit 22 finds that the recording has not been completed, a signal indicating this is given to the user, step 36. The signal can, for example, comprise an indication that the recording has not been completed, an indication of how large a part of the predetermined area has been stored or an indication of how the user needs to move his finger in order to continue with the recording. Thereafter, the flow returns to step 30 and the computer unit 22 awaits a new image being recorded.

If instead the computer unit 22 finds that the recording has been completed, all the recorded templates are transferred to and stored in the memory on the smart card, step 37. They will then constitute alternative templates for one and the same finger and one and the same person for selective use during later identity checks.

Thereafter a signal is given to the user that the recording has been completed, step 38.

Reference fingerprint data has now been recorded for the user. As the recording was carried out under secure conditions and the user's identity is also recorded on the smart card, his identity is known.

In the embodiment described above, each recorded image is processed separately and a template or a set of reference fingerprint data is determined for each image. The images thus do not need to overlap each other and the coordinates for the private partial areas are expressed in a local coordinate system for each template where the public partial area defines the origin. A variant of this is to construct the alternative templates successively. In such an embodiment, the first image can be recorded and processed in the way described above. When the processing of this image has been completed, there is thus stored a first template that comprises a public partial area and a plurality of private partial areas. When the second image has been recorded and accepted in step 31, one or more of the partial areas in the first template are compared with the second image in order to check whether any of the partial areas has a match in the second image so that the relative positions of the first and the second image can thereby be determined. If none of the partial areas in the first template has a match in the second image, the user receives an indication that his finger is to be moved and a new image is to be recorded. If any one of the partial areas has a match, partial areas are extracted from the second image in the same way as for the first image. The position of these partial areas in relation to the reference point in the first image is now known, as the relative positions of the first and the second image have been established. The positions can thus be expressed in a coordinate system that is common to the first and the second image and where, for example, a partial area extracted from the first image defines the origin. The partial areas from the second image are thus stored with their coordinates in the first template, after which a check is carried out as to whether the recording has been completed. If such is not the case, a third image is recorded and the method for the second image is repeated. When the recording is judged to have been completed, there is stored a single template with a large number of partial areas, of which at this stage only one is selected as a public partial area. Before storage on the smart cart is carried out in step 37, however, one or more additional partial areas are selected as public partial areas. The partial areas can then be divided and stored on the smart card as a number of separate templates, each of which contains a public partial area and a plurality of private partial areas with associated coordinates. Each template thus contains a complete set of data that is to be used for verification. Certain data can, however, be identical for two templates, for example if two templates are allowed to have a private partial area that is the same for both templates. Alternatively, all the partial areas can be stored together as a "super template", where different subsets form the alternative templates. Each such subset consists of a public partial area with a plurality of associated private partial areas. Certain private partial areas can thus belong to several subsets or templates, but are only stored once. In this case, the partial areas can be stored in a table which states which partial areas are public and which are private and also gives the coordinates of the respective partial areas in the common coordinate system in which one of the public partial areas defines the origin.

In a further embodiment, the images are not processed sequentially, but first a number of recorded images or a selection of these are combined into one large image. The combining can be carried out in a known way, for example by calculation of a score on the basis of similarity between overlapping pixels, or by means of some correlation technique. Partial areas are extracted from the combined image in the same way as described for the individual images above. One of the partial areas is selected as a public partial area with a reference point, in relation to which the positions of other extracted partial areas can be determined. When all the partial areas have been extracted, further partial areas can be selected as public partial areas. Both here and in the embodiment described above, the additional partial areas are selected if possible with such density that regardless of in which position an image is taken of the fingertip, there will be one, but preferably not more than one, public partial area that matches in the image. The storage will then be carried out as separate templates or as one "super template".

The advantage of storing the templates as subsets of a "super template" is that for a given memory size, a much larger number of alternative templates can be stored, as each partial area is only stored once.

Figure 4:
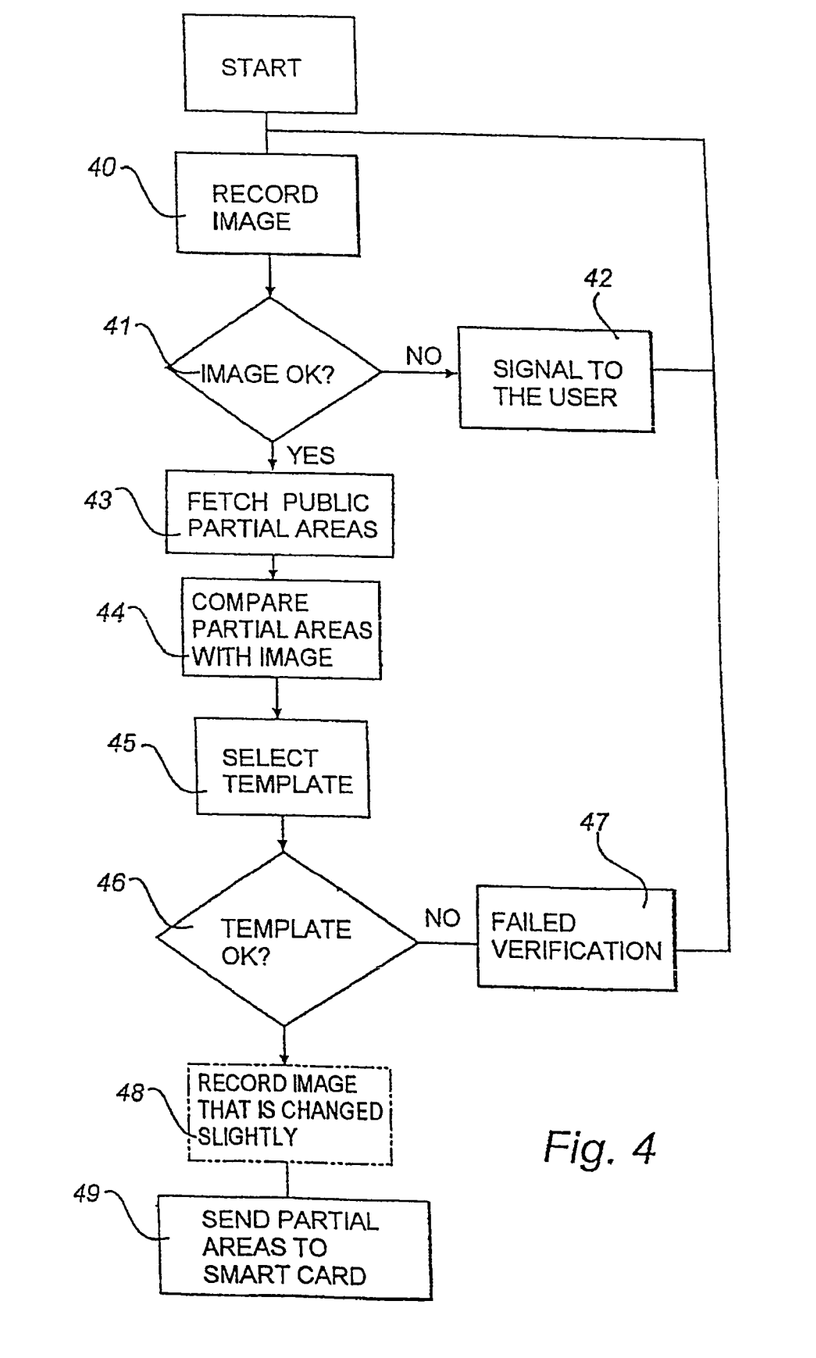
FIG. 4 is a flow chart and shows an example of a method for checking identity.

In the following, it will be described how an identity check that consists of a verification can be carried out using the system in FIG. 2, with reference to the flow chart in FIG. 4 and on the basis of the reference fingerprint data recorded by the method according to FIG. 3, which reference fingerprint data in this case thus includes partial areas that are stored on the smart card 24.

When a user wants to verify his identity, he places his smart card 24 with the templates stored in the memory in the smart card reader 23 and places the same finger that was used when making the recording of the template on the sensor 21.

When the user has placed his finger on the sensor 21, a current image is recorded, step 40, of an area on the fingertip. The area can, for example, be the area 3 in FIG. 1c. The image constitutes a digital representation of this area.

In a following step 41, it is checked whether the current image can be accepted. The check can comprise one or more of the elements mentioned above in connection with step 31.

If the current image cannot be accepted, a signal to this effect is given to the user in step 42, in the same way as in step 32. Thereafter the flow returns to step 40 and the computer unit 22 awaits the recording of a new image.

If, on the other hand, the current image can be accepted, the computer unit 22 reads the public parts of the templates stored on the smart card 23, step 43. Each of the public parts comprises, as has been described above, a public partial area and coordinates for the location of the private partial areas.

In step 44, each of the public partial areas is compared or correlated with the recorded current image of the fingerprint area. The correlation can be carried out against the whole image or against a part of this of a predetermined size, preferably in this case in the center of the image. During the correlation, the public partial area is "passed" over the image and a pixel by pixel comparison is carried out in each position. If a pixel in the template partial area corresponds to a pixel in the image of the current fingerprint, then a particular value, for example 1, is added to a total. If the pixels do not correspond, then the total is not increased. When the public partial area of the template has been passed over the whole image or the selected area of this, a position is obtained where the public partial area of the template correlates best with or overlaps the current fingerprint. The public partial area can also be rotated in relation to the image of the current fingerprint in order to determine whether a better correlation can be obtained.

On the basis of the public partial area for which the highest point total is obtained, in step 45 the template is selected or determined that is to be used for the final verification on the smart card. The point total for the public partial area must, however, exceed a predetermined reference total, step 46. If this is not the case, the verification is considered to have failed and a signal to this effect is given to the user in step 47 in a corresponding way to that described above, after which the flow returns to step 40.

The correlation can fail for at least two reasons. Either the current fingerprint does not come from the person or the finger from which the reference fingerprint has been recorded and then there is quite simply no match with any of the public partial areas in the current image. Alternatively, the current fingerprint and the templates come from the same person and the same finger, but the person in question is holding his finger in such a position in relation to the sensor 21 that none of the areas that correspond to the public partial areas lie within the area of the sensor. As several alternative templates are stored, the probability of this is, however, small.

If the templates are stored as separate templates and not as subsets of a "super template", it can, however, happen that the current area that has been recorded does not fully correspond to any one of the templates, but, for example, overlaps two adjacent templates. Some of the private partial areas in the selected template will not then have any match in the current image. The computer unit can determine that such is the case using the coordinates in the public part of the selected template, which coordinates thus indicate the location of the private partial areas in relation to the public partial area. If such a case is detected, the computer unit can give a signal to the user to the effect that he is to make a slight change in the position of his finger on the sensor, step 48, which step is shown by dashed lines in order to indicate that this step is not always carried out. This signal then preferably comprises an indication of in which direction the slight change of position is to made. When the image at the slightly changed position has been recorded by the sensor 21 and the computer unit 22 has checked that a sufficient number of the private partial areas have matches within the current image, partial areas of the current image are sent to the smart card 24 for final verification, step 49. More specifically, a partial area of a predetermined size is selected in the current image around each point that is defined by the coordinates in the public part of the template. The partial areas in the current image can, however, be slightly larger than corresponding partial areas in the template in order to compensate for any deformation of the fingerprint if the finger is placed on the sensor with a different pressure when recording the current image. Together with the partial areas of the current image, an indication, for example a number or a pair of coordinates, is also transmitted if required, concerning which of the templates on the smart card 24 is to be used for the final verification.

If the templates are stored as separate templates, the public part of the respective template contains the coordinates for all the private partial areas in the template.

If the templates are stored instead as subsets of a super template, coordinates can be associated with each public partial area for all the private partial areas in the super template or for a number of these. It can then happen that the coordinates for some of the private partial areas are such that corresponding areas of the finger of the checked person do not lie within the area of the sensor and accordingly are not found in the current image which has been recorded. There is then no partial area in the current image to send to the smart card. Random data or noise can then be sent instead of the partial areas in order to indicate that the partial area is missing or alternatively only the partial areas that are to be found within the current image may be sent, with an indication of which these areas are, for example by means of the coordinates. In this case, it is thus determined which template, that is which of the subsets of the super template, is to be used for the data that is returned to the smart card 24 from the computer unit 22. In this connection, it should be pointed out that the area of the current image that matches the public partial area can, but need not, be sent to the smart card.

A final comparison is then carried out on the smart card 24 between the private partial areas in the selected template and the current partial areas in the current image that has been sent to the smart card. The comparison does not constitute a part of the present invention and is therefore not described here in more detail. Instead, reference is made to the above-mentioned WO 01/84494.

Alternative Embodiments

Although a special embodiment has been described above, it will be obvious to those skilled in the art that many alternatives, modifications and variations are possible in the light of the above description.

For example, the smart card 24 and the smart card reader 23 can be a separate unit with which the computer unit 22 communicates. This separate unit, which can be portable or stationary, does not need to be in the physical vicinity of the computer unit 22, but communication can be carried out via, for example, a computer network, telecommunications network or a cable. The separate unit can, for example, be another computer, a mobile telephone or a PDA. The template can be stored in a protected memory, that is a memory that is protected against unauthorized access, in the separate unit.

In the description above, it has in addition been stated that when the correct template is to be determined during the identity check, the public partial areas of all the templates are compared against the current partial fingerprint. This is not completely necessary. It is possible to compare one public partial area at a time against the current partial fingerprint and after each comparison to check whether the public partial area matches sufficiently well. If so, the comparison can be terminated and a template that contains that public partial area is used for the identity check. Another alternative is to include information in the public part of each template concerning the relative positions of the partial areas of other templates. When a public partial area that matches the current partial fingerprint has been found, the template with the public partial area that has the best location in relation to the current partial fingerprint can be determined immediately. This is then the template that is to be used for the actual verification.

In the example above, three templates were stored. It is possible to use more or fewer templates.

The method for checking identity can be used for both verification and identification.

In the description above, it has been stated that the public part of the template contains a partial area of a recorded fingerprint image. Alternatively, however, the public part of the template can contain a set of features, for example features that are obtained from the same area of the finger as the private partial areas in the template. These can be used in a corresponding way to the public partial area. When it is to be determined which template is to be used for the identity check, the set of features in the public part of the template is thus sent to the computer unit, in which the set is compared with the current fingerprint image. The template for which the most matching features are obtained is then used for the identity check. The coordinates in the public part of the template, which for example can refer to a reference point in the form of a particular feature, are then used to determine which partial areas of the current fingerprint image are to be sent to the smart card or some other unit where the identity check is to be carried out.

As an additional variant, features from the whole area of the finger that is covered by all the templates can be recorded and form public data that is common to all the templates. During the identity check, this public data is then sent from the smart card to the computer unit and is compared with features in the current image. Only certain features in the public data will have matches in the current image, but by means of these the current image and the data on the smart card can be registered with each other so that a suitable template can be used for the identity check.

FIG. 1a shows that the areas overlap each other. This is not necessary, particularly if the user receives a signal with an indication concerning how his finger is to be moved after a failed verification attempt.

In the method described in connection with the flow chart in FIG. 3, it is stated that the reference fingerprint data is recorded successively until a particular criterion is fulfilled. As an alternative, it could be possible to let the user move his finger around to a plurality of different positions on the fingerprint sensor, record an image for each position and, when a certain number of images has been recorded or after a certain length of time, terminate the recording of the images, select a predetermined number of images on the basis of the relative overlapping so that as good a spread as possible is obtained, and determine and store a set of reference fingerprint data for each of the selected images.

The methods according to the different embodiments and aspects of the invention may be combined in different ways without departing from the scope of the appended claims.

The invention claimed is:

1. A method for recording reference fingerprint data for a person, comprising the steps of:
 receiving at least two fingerprint images that depict at least partially different areas of one and the same finger of the person;
 storing, in a first computer-readable recording medium of a first computer processing device, data from said at least two fingerprint images as at least two alternative sets of reference fingerprint data, that comprise data from at least partially different areas of the finger, for use in checking the identity of the person, wherein said at least two alternative sets of reference fingerprint data are stored in the first computer-readable recording medium of the first computer processing device in which checking of the person's identity is to be carried out, and each of the sets of reference fingerprint data comprises public data that can be communicated from the first computer processing device to a second computer processing device during the check, and also private data that is used exclusively in the first computer processing device during the check; and
 checking, in the first computer processing device, whether said at least two fingerprint images together cover an area of the finger that is larger than a predetermined area and, if so, giving an indication to the person that the recording has been completed.

2. The method as claimed in claim 1, further comprising the step of giving an indication to the person concerning how the fingertip is to be moved in relation to the sensor.

3. A method for recording reference fingerprint data for a person, comprising the steps of:
 receiving at least two fingerprint images that depict at least partially different areas of one and the same finger of the person;
 storing, in a first computer-readable recording medium of a first computer-processing device, data from said at least two fingerprint images as at least two alternative sets of reference fingerprint data, that comprise data from at least partially different areas of the finger, for use in checking the identity of the person, wherein said at least two alternative sets of reference fingerprint data are stored in a the first computer-readable recording medium of the first computer processing device in which checking of the person's identity is to be carried out, and each of the sets of reference fingerprint data comprises public data that can be communicated from the first computer processing device to a second computer processing device during the check, and also private data that is used exclusively in the first computer processing device during the check; and
 receiving more than two fingerprint images, checking, in the first computer processing device how the received images overlap each other, and selecting a predetermined number of the received images on the basis of the overlap,
 wherein the storage of said at least two alternative sets of reference fingerprint data is carried out from the selected images.

4. A method for checking identity, comprising the steps of:
 receiving a current fingerprint image that depicts a part of a finger of a person whose identity is to be checked;
 comparing data from the current fingerprint image with data from at least a first set of reference fingerprint data selected from at least two previously stored alternative sets of reference fingerprint data that relate to at least partially different areas of one and the same finger from a person whose identity is known; and, on the basis of the result of the comparison;
 determining, in a first computer processing device, which of said at least two alternative sets of reference fingerprint data is to be used for the identity check,
 wherein said at least two alternative sets of reference fingerprint data are stored in a first computer-readable recording medium of the first computer processing device and each comprise public data that can be communicated from the first computer processing device to a second computer processing device during the identity check, and private data that is used exclusively in the first computer processing device during the check,
 wherein the step of comparing comprises receiving public data from the first computer-readable recording medium and comparing, in the first computer processing device, the received public data with the data from the current fingerprint image, and
 wherein the data from the current fingerprint image is compared with data from all the sets of reference fingerprint data to determine which set of reference fingerprint data is to be used for the identity check.

5. The method as claimed in claim 4, wherein the first set of reference fingerprint data comprises at least one partial area of a previously recorded fingerprint image of a part of a finger of the person whose identity is known, and
 the step of comparing comprises checking whether the partial area has a match in the current fingerprint image.

6. The method as claimed in claim 4, wherein the first set of reference fingerprint data comprises a plurality of reference features, and
 the step of comparing comprises comparing reference features with features in the current fingerprint image.

7. The method as claimed in claim 4, further comprising the step of giving an indication to the person whose identity is to be checked concerning how his finger is to be moved in relation to the sensor.

8. A device for checking identity, the device comprising a signal processor, wherein:
 the signal processor is adapted to receive at least two fingerprint images that depict at least partially different areas of one and the same finger of the person;
 the signal processor is adapted store data from said at least two fingerprint images as at least two alternative sets of reference fingerprint data, that comprise data from at least partially different areas of the finger, for use in checking the identity of the person, wherein said at least two alternative sets of reference fingerprint data are stored in a first unit in which checking of the person's identity is to be carried out, and each of the sets of reference fingerprint data comprises public data that can be communicated from the first unit to a second unit during the check, and also private data that is used exclusively in the first unit during the check; and the signal processor is adapted to check whether said at least two fingerprint images together cover an area of the finger that is larger than a predetermined area and, if so, give an indication to the person that the recording has been completed.

9. The device as claimed in claim 8, wherein the signal processor is further adapted to give an indication to the person concerning how the fingertip is to be moved in relation to the sensor.

10. A device for checking identity, the device comprising a signal processor which is arranged to:

receive at least two fingerprint images that depict at least partially different areas of one and the same finger of the person;

store data from said at least two fingerprint images as at least two alternative sets of reference fingerprint data, that comprise data from at least partially different areas of the finger, for use in checking the identity of the person, wherein said at least two alternative sets of reference fingerprint data are stored in a first unit in which checking of the person's identity is to be carried out, and each of the sets of reference fingerprint data comprises public data that can be communicated from the first unit to a second unit during the check, and also private data that is used exclusively in the first unit during the check; and receive more than two fingerprint images, check how the received images overlap each other, and select a predetermined number of the received images on the basis of the overlap, wherein the signal processor is adapted to store said at least two alternative sets of reference fingerprint data from the selected images.

11. A device for checking identify, the device comprising a signal processor which is arranged to:

receive a current fingerprint image that depicts a part of a finger of a person whose identity is to be checked;

compare data from the current fingerprint image with data from at least a first set of reference fingerprint data selected from at least two previously stored alternative sets of reference fingerprint data that relate to at least partially different areas of one and the same finger from a person whose identity is known; and, on the basis of the result of the comparison; and determine which of said at least two alternative sets of reference fingerprint data is to be used for the identity check, wherein said at least two alternative sets of reference fingerprint data are stored in a first unit and each comprise public data that can be communicated from the first unit to a second unit during the identity check, and private data that is used exclusively in the first unit during the check, wherein the signal processor is adapted to execute the comparing operation by receiving public data from the first unit and comparing the received public data with the data from the current fingerprint image, and wherein the signal processor is adapted to compare the data from the current fingerprint image with data from all the sets of reference fingerprint data to determine which set of reference fingerprint data is to be used for the identity check.

12. The device as claimed in claim 11, wherein the first set of reference fingerprint data comprises at least one partial area of a previously recorded fingerprint image of a part of a finger of the person whose identity is known, and the signal processor is adapted to execute the comparing operation by checking whether the partial area has a match in the current fingerprint image.

13. The device as claimed in claim 11, wherein the first set of reference fingerprint data comprises a plurality of reference features, and the signal processor is adapted to perform the comparing operation by comparing reference features with features in the current fingerprint image.

14. The device as claimed in claim 11, wherein the signal processor is further adapted to give an indication to the person whose identity is to be checked concerning how his finger is to be moved in relation to the sensor.

15. A computer-readable recording medium having a computer-readable recording medium comprising program code recorded thereon that causes a computer to check identity, the program code causing the computer to perform operations comprising:

receiving at least two fingerprint images that depict at least partially different areas of one and the same finger of the person;

storing data from said at least two fingerprint images as at least two alternative sets of reference fingerprint data, that comprise data from at least partially different areas of the finger, for use in checking the identity of the person, wherein said at least two alternative sets of reference fingerprint data are stored in a first unit in which checking of the person's identity is to be carried out, and each of the sets of reference fingerprint data comprises public data that can be communicated from the first unit to a second unit during the check, and also private data that is used exclusively in the first unit during the check; and receiving more than two fingerprint images, checking how the received images overlap each other, and selecting a predetermined number of the received images on the basis of the overlap, wherein the storage of said at least two alternative sets of reference fingerprint data is carried out from the selected images.

16. The computer-readable recording medium as claimed in claim 15, wherein the program code further causes the computer to perform an operation of giving an indication to the person concerning how the fingertip is to be moved in relation to the sensor.

17. A computer-readable recording medium having a computer-readable recording medium comprising program code recorded thereon that causes a computer to check identity, the program code causing the computer to perform operations comprising:

receiving at least two fingerprint images that depict at least partially different areas of one and the same finger of the person;

storing data from said at least two fingerprint images as at least two alternative sets of reference fingerprint data, that comprise data from at least partially different areas of the finger, for use in checking the identity of the person, wherein said at least two alternative sets of reference fingerprint data are stored in a first unit in which checking of the person's identity is to be carried out, and each of the sets of reference fingerprint data comprises public data that can be communicated from the first unit to a second unit during the check, and also private data that is used exclusively in the first unit during the check; and receiving more than two fingerprint images, checking how the received images overlap each other, and selecting a predetermined number of the received images on the basis of the overlap, wherein the storage of said at least two alternative sets of reference fingerprint data is carried out from the selected images.

18. A computer-readable recording medium having a computer-readable recording medium comprising program code recorded thereon that causes a computer to check identity, the program code causing the computer to perform operations comprising:

receiving a current fingerprint image that depicts a part of a finger of a person whose identity is to be checked;

comparing data from the current fingerprint image with data from at least a first set of reference fingerprint data selected from at least two previously stored alternative sets of reference fingerprint data that relate to at least partially different areas of one and the same finger from a person whose identity is known; and, on the basis of the result of the comparison; and determining which of said at least two alternative sets of reference fingerprint data is to be used for the identity check, wherein said at least two alternative sets of reference fingerprint data are stored in a first unit and each comprise public data that can be communicated from the first unit to a second unit during the identity check, and private data that is used exclusively in the first unit during the check, wherein the comparing operation comprises receiving public data from the first unit and comparing the received public data with the data from the current fingerprint image, and wherein the data from the current fingerprint image is compared with data from all the sets of reference fingerprint data to determine which set of reference fingerprint data is to be used for the identity check.

19. The computer-readable recording medium as claimed in claim 18, wherein the first set of reference fingerprint data comprises at least one partial area of a previously recorded fingerprint image of a part of a finger of the person whose identity is known, and the comparing operation comprises checking whether the partial area has a match in the current fingerprint image.

20. The computer-readable recording medium as claimed in claim 18, wherein the first set of reference fingerprint data comprises a plurality of reference features, and the comparing operation comprises comparing reference features with features in the current fingerprint image.

21. The computer-readable recording medium as claimed in claim 18, wherein the program code further causes the computer to perform an operation of giving an indication to the person whose identity is to be checked concerning how his finger is to be moved in relation to the sensor.

* * * * *